March 2, 1943.  P. SCHLACK  2,313,026
PROCESS FOR THE MANUFACTURE OF LACTAMS FROM OXIMES OF CYCLIC KETONES
Filed April 10, 1940
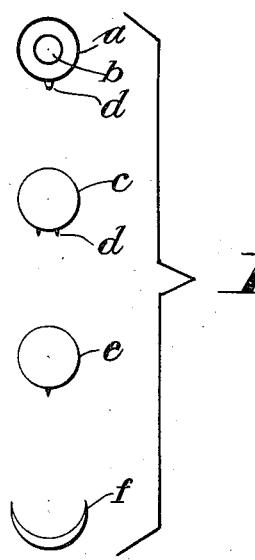
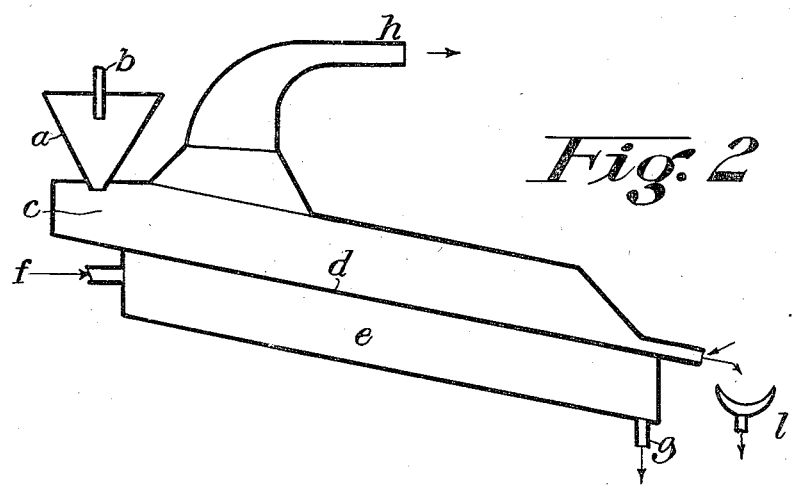
Paul Schlack INVENTOR
BY *his* ATTORNEYS Patented Mar. 2, 1943

2,313,026

UNITED STATES PATENT OFFICE 2,313,026

PROCESS FOR THE MANUFACTURE OF LACTAMS FROM OXIMES OF CYCLIC KETONES

Paul Schlack, Berlin-Treptow, Germany; vested in the Alien Property Custodian

Application April 10, 1940, Serial No. 328,905
In Germany February 13, 1939

11 Claims. (Cl. 260—239)

This invention relates to the manufacture of lactams from oximes of cyclic ketones.

It is known to the art that cyclic ketoximes rearrange to lactams when heated either with strong sulfuric acid or with mixtures of strong sulfuric acid with glacial acetic acid. While good yields of lactams are obtained by these prior art processes they are not susceptible, however, to successful adaptation to large scale operation, because the rearrangement reaction is highly exothermic and unless the heat evolved is rapidly and efficiently dissipated it may go explosively.

It is an object of this invention to provide a process which allows the production of lactams from cyclic ketoximes on a practical commercial scale. Another object is to provide a process for the production of lactams from cyclic ketoximes in good yields.

These and other objects will be apparent from the following detailed specification.

This invention is based on the observation that the rearrangement of cyclic ketoximes, using strong sulfuric acid or mixtures of strong sulfuric acid with fatty acids or phosphoric acid can be carried out on a large scale safely by passing the reaction mixture continuously at a controlled rate over heated areas or through heated vessels maintained at a temperature above the rearrangement temperature for the rearrangement reaction. It is preferable to pass the reaction mixture through the heated zones in a thin layer so that the rearrangement may not occur too violently. During continuous operation, it is advisable to allow the liquid to pass through the reaction zone only in a thin layer; on the other hand, the reaction should be limited as to space, and to a certain extent, should be carried out in one step since otherwise more or less large quantities of the oxime pass through unchanged or are lost by reconversion to the ketone and by partial resinification. This loss can be minimized by passing the liquid several times through heated zones. Repeating the rearrangement, however, requires increasing temperatures, which is harmful if secondary products which tend to resinify, e. g., ketones and their primary condensation products, have formed in considerable quantities in the first step. If the first step is carried out with high conversions repeated passage through a second or third reaction zone increases the yield of lactam. It is generally preferable to use a relatively short heating zone and to let the reaction take place correspondingly rapidly. With regard to the ease of rearrangement the individual ketoximes show considerable differences so that the most favorable operating conditions for every product have to be determined by simple preliminary experiments. In general, it may be said that alkylated cyclic ketoximes are converted more slowly or require higher temperatures, but nevertheless yields of the order of 90% and above can generally be obtained.

In practicing the invention the oxime to be rearranged is dissolved in strong sulfuric acid, e. g., sulfuric acid of 80 to 94% concentration and, if necessary, the solution diluted with a fatty acid such as butyric acid or with phosphoric acid. The solution thus made is passed in a thin stream at a controlled rate over zones heated to above the rearrangement temperature for the rearrangement reaction. By the process of this invention, solutions of oximes of far greater concentration than hitherto thought possible can be handled safely and without sacrifice in the yield of lactam. For instance, in the case of cyclohexanone oxime concentration of 40 to 45% by weight in about 90% sulfuric acid may be used, and this operates to improve the throughput of the process. Since the viscosity of the solutions increases with the concentration there is a tendency to increase the time of passage through the reaction zone. This has to be taken into consideration when operating with solutions of high concentration. Thus with such solutions the course in the reaction zone should be shortened or the incline of the course increased so as to result in a rate of passage through the zone commensurate with the less viscous solution.

Improved yields of the lactam are obtained by effecting the rearrangement rapidly and it has been found advisable therefor to preheat the reaction mixture to a temperature below the threshold of the rearrangement reaction in an open system. For safety, the preheating may be carried out in a container or in a tubular system with high heat capacity so that the quantity of heat formed by spontaneous reaction may be dissipated rapidly, thereby avoiding the danger of the reaction taking place violently. For example, the reaction mixture may be heated by means of a liquid circuit kept at a constant temperature. The length of time that the reaction mixture stays in the reaction zone is regulated either by varying the length of the tubes or by means of obstacle checking or changing the direction of flow; such obstacles may be in the form of rolled shaped narrowings or spiral notchings.

The reaction vessel in which the rearrangement is carried out may be constructed in different ways. The liquid, for instance, may be conducted in various streams through heated tubes made of heat and chemically resistant glass such as quartz or quartz ware, or of tantalum or silicon.

As already stated, the reaction is preferably confined to a short reaction zone and the heat of reaction rapidly dissipated. For this reason non-metallic structural materials which are temperature and corrosion resistant, such as quartz ware, are sometimes more suitable than metals. This is especially true when the parts of the apparatus are quite massive or stay in a heat-conductive connection with metallic parts of the apparatus outside the reaction zone.

A form of construction of the apparatus suitable for the large scale operation is shown in Figure 1. The oxime solution together with the sulfuric acid is carried by a pump (not shown in the drawing) into a jet-pipe $a$ which is kept at a constant temperature of about 60° to 80° C. by a liquid circulating inside tube $b$. From tube $b$ the liquid drops down to tube $c$ which is heated to 160° C. by means of vapor from a boiling liquid. The rearrangement sets in when the cyclic ketoxime solution comes in contact with the surface heated to above the rearrangement temperature for the rearrangement reaction. From the dripping member $d$ the reaction mixture passes to a second heating tube $e$ heated to a higher temperature, for instance 180° C. From $e$ the reaction mixture passes into the cooled collection groove $f$ and then into a vessel containing ice (not shown in the drawing) where it is diluted to a sulfuric acid concentration of about 40%. The number of heating tubes which may be used is not limited to any specific number. As a rule, however, two or three steps are sufficient, but a plurality of such dripping members may be arranged in parallel form and put up under the same fume cupboard.

A different construction is shown in Figure 2. The oxime solution is fed through pipes $b$ by holding a constant level on a casting member $a$ through the slits of which it is cast on to the inclined plane $c$. From here the solution is conducted as liquid film onto the heated inclined plane $d$ where the reaction takes place. The heating is accomplished by a box $e$ provided with a supply tube $f$ and an outlet $g$ for the heating medium. The lactam solution is collected in groove $l$ and afterwards worked up. The fumes formed during the reaction are sucked off in the direction of the arrow by a suction hood.

The rearranging solution can be allowed to flow into a funnel heated to the reaction temperature and the lactam solution drawn off by means of siphon tubes. In this case also several rearranging zones can be connected in series.

The heating of different parts of the apparatus (tubes, gratings, wire nets, flat or wavy inclined planes, and curved surfaces) effecting the rearrangement can be accomplished in any convenient way, such as, for example, by means of open flames, by electric resistance heating, or by liquid or steam circulating in a closed system, etc. It is also possible to pass the oxime solution through jets into a tower heated by means of hot waste gases and to draw off the lactam from the bottom.

In contrast to the usual procedure it is found advantageous not to neutralize by adding alkali to the acid solution but rather to let the acid solution flow into the neutralizing liquid and to keep an excess of neutralizing agent in the neutralization vessel. As a neutralizing medium, ammonia and ammonium salts of weak acids, alkali and alkaline earth metal hydroxides and carbonates, e. g., sodium hydroxide and potassium carbonate, milk of lime and suspensions of magnesium carbonate may be used. With the alkali metal and the alkaline earth metal neutralizing agents (with the exception of magnesium carbonate) salt precipitation occurs even when water soluble sulfates are formed, at least when solutions of cyclic ketoxime of high concentration are being rearranged. The preferred neutralizing agents are ammonia and salts of ammonia with weak acids since ammonium sulfate which is highly water soluble is thereby formed. This high water solubility is an advantage since it makes it possible to work at such high concentrations that the lactam formed is largely salted out, separating as an oily layer on the surface of the solution. Although organic amines and such salts as yield highly water soluble sulfates may be used in place of ammonia, this replacement is of advantage only when economic utilization of the salts formed is possible. Volatile amines may be recovered by distillation with lime.

In place of the hydroxides or the carbonates, salts of weak organic acids may be employed, especially if they are insoluble or nearly insoluble in the reaction mixture. The salts formed are then precipitated together with the lactam formed from such reaction media. Water soluble salts of such acids as isobutyric, valeric, and technical isohexanoic acid with the light metals and phenols in the form of alkali phenolates may be used. In order to dissipate the heat of neutralization, a volatile liquid such as propyl chloride or propane may be added to the reaction mixture during neutralization.

The use of salts of sulfurous acid particularly ammonium sulfite as neutralizing media is advantageous because the lactam thus obtained is as a rule practically free of oxime and even after a single distillation shows no tendency to turn yellow upon standing. The quality is also improved by treating the neutralized reaction mixture with steam in order to remove volatile impurities and impurities which have a tendency to resinify, e. g., ketones, oximes, and volatile cleavage products. This treatment also operates to concentrate the mother solution.

The lactam may be removed from the aqueous mother liquor by extraction with a volatile solvent like methylene chloride, chloroform, or ethyl acetate. The extraction may be operated continuously and the extracting solvent removed from the lactam by continuous distillation. Generally, it is not necessary to dry the extract before distillation, but if desired this may be accomplished by means of potassium carbonate or silica gel.

In place of easily volatile solvents, the lactams may be extracted with solvents having a moderately high boiling point; especially those solvents having water-absorbing properties. Examples of such solvents are butanol or amyl alcohol. The solubility of these alcohols in water may be decreased by adding benzine. High boiling benzines may be used alone, if desired, especially when the mother solution has high salt concentration. The lactams can be obtained directly by crystallization from the benzine solution.

The following examples are submitted to illustrate this invention and are not to be construed as limitations thereof.

*Example I*

6.78 kgs. (60 moles) of cyclohexanoneoxime is dissolved in 5.425 liters of sulfuric acid of about 86% concentration at a temperature not exceeding 50° C. The solution is heated to 50° C. and allowed to flow through a dripping apparatus into a tube furnace heated to 165° C. and containing 20 tubes 2.5 cm. chemically resistant hard glass. The length of the heating zone is 25 cm. The time of flow through the heating zone is 4 to 5 hrs. The reaction takes place at the point of injection to the heated surface. The vapors are removed from the reaction zone by suction.

The lactam solution is collected into a groove and permitted to flow through a cooler and from there into a mixing vessel, equipped with a stirrer, and kept continuously filled with ice. In this container the solution is diluted and the cooled solution permitted to flow into a vessel containing aqueous ammonia. The ammonia concentration is kept at such a point by the addition of fresh ice-cold ammonia as to maintain an alkaline reaction at all times. The lactam formed separates as a brown oily layer, and is removed from the concentrated ammonium sulfate solution by decantation. The concentrated ammonium sulfate solution is extracted several times with chloroform to remove the last traces of lactam. The chloroform extract is combined with the oil layer, filtered, and fractionated under reduced pressure. The yield of lactam is 80 to 89% of theory.

Example II

A solution of cyclohexanoneoxime in 89% sulfuric acid is rearranged as described in Example I. The cold solution of lactam diluted with ice is allowed to flow into saturated ammonium sulfite solution and the sulfurous acid liberated is absorbed in ammonium hydroxide solution. After the neutralization reaction has been completed the excess sulfurous acid is removed from the lactam layer and the mother liquor extracted with chloroform. The lactam is recovered from the chloroform by distillation. The yield of lactam is the same as in Example I but the lactam is of purer quality containing only traces of unchanged oxime. The distilled lactam may be further purified by recrystallization from three times its weight of benzene boiling at 65° to 80° C.

The oximes of isomeric methyl cyclohexanones may be rearranged as described above, but since they react somewhat slower than cyclohexanoneoxime it is desirable to raise the temperature of rearrangement about 10° C. Cyclopentanoneoxime may be rearranged similarly to cyclohexanoneoxime.

Example III

A 40% solution of cyclohexanoneoxime in 87% sulfuric acid is allowed to drop through a jet onto a flat acid-resistant enamelled bell jar heated to between 150° and 160° C. The solution dripping from the lower end of the bell is collected in a cup and allowed to flow to a second annular nozzle which again distributes the solution over a bell, this time heated to 180° C. The lactam solution flowing off is collected in a funnel, cooled, and allowed to flow onto a cooled column through which ammonia solution is fed from above and chloroform from below. The chloroform solution of the lactam flows continuously to a still where the chloroform is continuously removed by distillation.

Example IV

Example II is repeated except that the cooling step is omitted. At the end of the reaction, the mixture is freed of volatile components (ketones and oximes) by steam distillation. Due to concentration during the distillation some of the ammonium sulfate separates in the form of large crystals. The lactam is extracted from the water layer with butanol containing 30% benzine (B. P. 150° C.). Even after a single distillation, lactam which does not turn yellow upon storage is obtained in high yield. The lactam thus produced is practically free of oxime.

It is apparent that many widely different embodiments of this invention may be made without departing from the spirit and scope thereof, and therefore it is not intended to be limited except as indicated in the appended claims.

I claim:
1. Process for the manufacture of lactams by Beckmann rearrangement of cyclic ketoximes, the steps which comprise dissolving the oxime in sulfuric acid of a concentration of about 80 to 94% and passing the oxime solution continuously in a thin layer through a reaction zone kept at a temperature above the rearrangement temperature for the rearrangement reaction.

2. The process for the manufacture of lactams by Beckmann rearrangement of cyclic ketoximes which comprises dissolving the oxime in strong sulfuric acid, passing the oxime-sulfuric acid solution continuously through a reaction zone kept at a temperature above the rearrangement temperature for the rearrangement reaction, and neutralizing the resulting reaction products with a salt of a weak acid.

3. The process for the manufacture of lactams by Beckmann rearrangement of cyclic ketoximes which comprises dissolving the oxime in strong sulfuric acid, passing the oxime-sulfuric acid solution continuously through a reaction zone kept at a temperature above the rearrangement temperature for the rearrangement reaction, and neutralizing the resulting reaction products with ammonium sulfite.

4. The process for the manufacture of lactams by Beckmann rearrangement of cyclic ketoximes which comprises dissolving the oxime in strong sulfuric acid, passing the oxime-sulfuric acid solution continuously through a reaction zone kept at a temperature above the rearrangement temperature for the rearrangement reaction, neutralizing the resulting reaction products while adding a low boiling organic material to the solution being neutralized.

5. The process for the manufacture of lactams by a Beckmann rearrangement of cyclic ketoximes, the steps which comprise dissolving the oxime in sulfuric acid of a concentration of about 80% to 94% and passing the oxime solution continuously through various reaction zones connected in series with each other, said zones showing step-like rising temperatures and said temperatures being kept above the rearrangement temperature for the rearrangement reaction.

6. The process in accordance with claim 2 characterized in that the oxime is a cyclohexanoneoxime.

7. The process in accordance with claim 2 characterized in that the oxime is cyclohexanoneoxime.

8. The process in accordance with claim 2 characterized in that the oxime is methyl cyclohexanoneoxime.

9. The process in accordance with claim 2 characterized in that the oxime is cyclopentanoneoxime.

10. The process in accordance with claim 4 characterized in that the low boiling organic material is propyl chloride.

11. The process in accordance with claim 4 characterized in that the low boiling organic material is propane.

PAUL SCHLACK.